E. E. PYLE.
DEVICE FOR GUIDING TRACTORS.
APPLICATION FILED MAR. 27, 1920.

1,387,556.

Patented Aug. 16, 1921.

INVENTOR
E. E. Pyle
BY
ATTORNEYS form: md

UNITED STATES PATENT OFFICE.

ELTON ELMER PYLE, OF MORRIS, ILLINOIS.

DEVICE FOR GUIDING TRACTORS.

1,387,556.   Specification of Letters Patent.   Patented Aug. 16, 1921.

Application filed March 27, 1920. Serial No. 369,408.

*To all whom it may concern:*

Be it known that I, ELTON E. PYLE, a citizen of the United States, and a resident of Morris, county of Grundy, and State of Illinois, have invented a new and useful Improvement in Devices for Guiding Tractors, of which the following is a full, clear, and exact description.

My invention relates to improvements in devices for guiding tractors, and it consists in the combinations, constructions, and arrangements herein described and claimed.

An object of my invention is to provide a device for guiding tractors in which means is provided for holding the steering apparatus of a tractor used in plowing in such position as to keep one of the front wheels of the tractor in a furrow.

A further object of my invention is to provide a device of the type described which is adapted for application to the steering apparatus of tractors of various types.

A further object of my invention is to provide a device of the type described that can be attached quickly to the steering apparatus of a tractor without altering in any way the structure of the latter.

A further object of my invention is to provide a device of the type described that is simple in construction and operation and inexpensive to manufacture.

Other objects and advantages will appear in the following specification, and the novel features of the invention will be particularly pointed out in the appended claims.

My invention is illustrated in the accompanying drawings, forming part of this application, in which—

Figure 1:
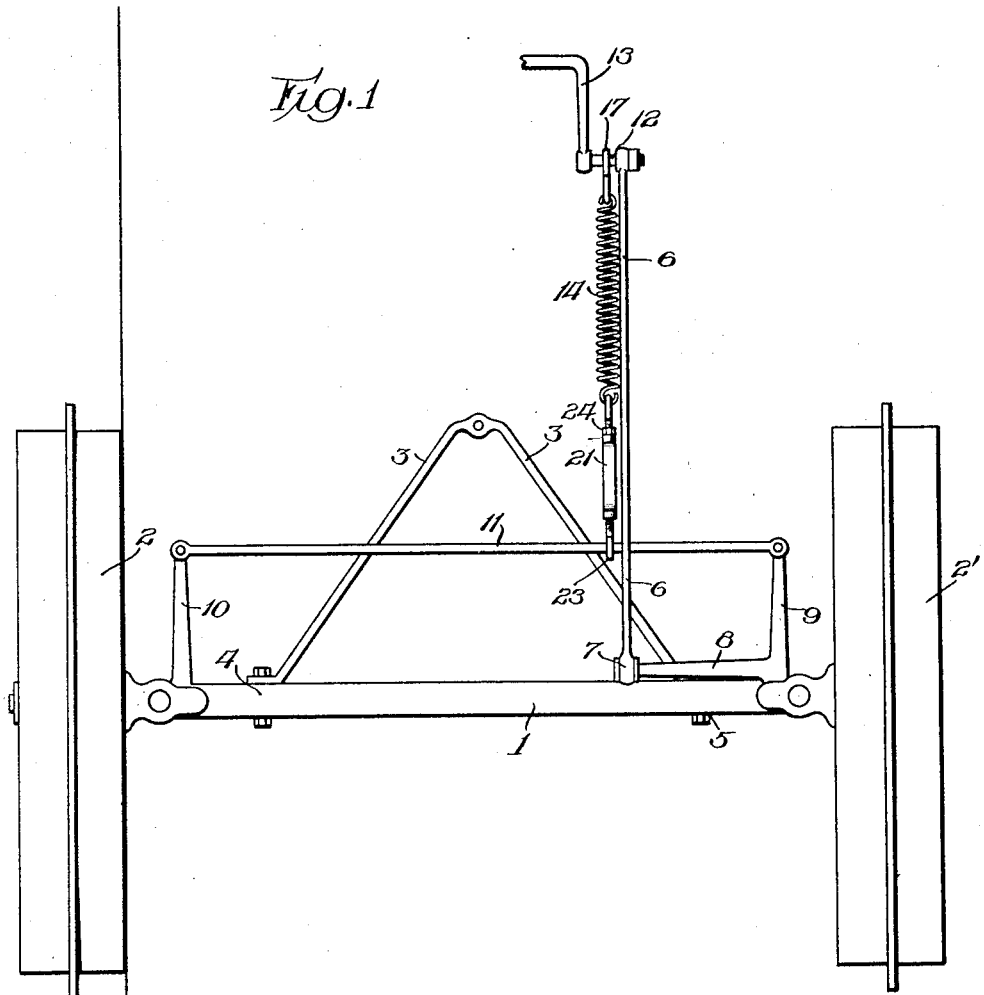
Figure 2:
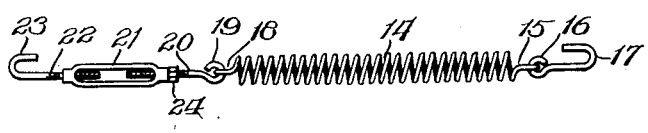

Figure 1 is a plan view of the device operatively applied to the steering apparatus of a tractor, Fig. 2 is a detailed side view of the device.

While I have shown the device applied to the steering apparatus of a tractor of the Ford type in the accompanying drawings, it is to be understood that the device is suitable for use with other types of tractors.

Referring to Fig. 1 of the accompanying drawings, it will be noted that I make use of a front axle 1 of a tractor having a right front wheel 2 and a left front wheel 2'. A U-shaped radius rod is indicated by 3 and is secured to the front axle in an ordinary manner at 4 and 5. A steering rod 6 has one end fastened at 7 to a lateral extension 8 of a steering knuckle 9, which is secured in an ordinary manner to the front axle 1 near the left hand wheel 2'. A second steering knuckle 10 has one end secured to the front axle 1 near the right hand wheel. The steering knuckles 9 and 10 are connected by a tie rod 11. The steering rod 6 is secured at its other end to a pin 12 which projects laterally from a steering arm 13. The steering arm 13 is operatively connected to a steering wheel (not shown) in an ordinary manner. The parts described so far are of an ordinary construction and form no part of my invention except in so far as they coöperate with the parts about to be described.

Referring now particularly to Fig. 2, I provide a tension spring 14 which has one end formed into a link 15 and the other end formed into a link 18. The link 15 engages an eye 16 of a hook 17; the link 18 engages an eye 19 of a threaded rod 20. The latter is screwed into an end of a turnbuckle 21. A threaded rod 22 having one end formed into a hook 23 is screwed into the other end of the turnbuckle 21. The threaded rod 20 is provided with a lock nut 24 which may be set to limit the movement of the turnbuckle 21 along the threaded rod 20.

From the foregoing description of the various parts of the device, the operation thereof may readily understood. The hook 17 engages the pin 12 and the hook 23 is hooked over the tie rod 11. It is to be understood that when the steering wheel (not shown) is turned to the right, the steering arm 13 is pulled backwardly, thus guiding the tractor to the right. When the steering wheel (not shown) is turned to the left, the steering arm 13 will be pushed forwardly, thus guiding the tractor to the left. The spring 14 exerts a tension against the tie rod 11, thus keeping the wheel 2 in a furrow when the tractor is used in plowing, and it is therefore not necessary for the driver to constantly turn the steering wheel (not shown) in order to maintain the wheel 2 in the furrow. The driver can therefore dismount from the tractor and walk behind the same, thus preventing the strain occasioned by constant effort required to guide a tractor when my improved guiding device is not used. The tension of the spring 14 is adjusted by turning the turnbuckle 21 which is locked in adjusted position by means of the lock nut 24. The device can be applied quickly without the necessity of using any tools or without altering in any way the steering apparatus of a tractor of an ordinary type.

I claim:

1. In combination with a steering apparatus of a tractor comprising a shiftable steering arm, steering knuckles, a tie rod connecting the steering knuckles, a steering rod operatively connecting the steering arm and a steering knuckle, a device for guiding the tractor to maintain the ground wheels at one side thereof in constant contact with the furrow comprising a tension member having one end secured to the steering arm and the other end secured to the tie rod in said steering apparatus.

2. In combination with the steering mechanism in a tractor, a device for guiding the tractor comprising a tension spring having a link formed at each end, a hook having an eye engaged with one of said links, said hook being adapted for hooking to a steering arm included in said steering mechanism, a threaded bolt having an eye engaged with the second of said links, a bolt having a threaded end and a hook formed at its other end, said hook being adapted for hooking to the tie rod which operatively connects the knuckles included in said steering mechanism, and a turnbuckle adjustably connecting said first named threaded bolt with the threaded end of said second named bolt, whereby the tension of said spring on said tie bar can be lessened or increased as required to guide the tractor to maintain the wheels at one side of the tractor in a furrow in which the wheels run.

ELTON ELMER PYLE.